US012764246B2

(12) United States Patent
Yamashita et al.

(10) Patent No.: US 12,764,246 B2
(45) Date of Patent: Oct. 13, 2026

(54) SELECTION SYSTEM, METHOD, AND COMPUTER PROGRAM FOR SELECTING INK AMOUNT SET

(71) Applicant: SEIKO EPSON CORPORATION, Tokyo (JP)

(72) Inventors: Mitsuhiro Yamashita, Matsumoto (JP); Takahiro Kamada, Matsumoto (JP); Takuya Ono, Shiojiri (JP); Yuko Yamamoto, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 218 days.

(21) Appl. No.: 18/763,064

(22) Filed: Jul. 3, 2024

(65) Prior Publication Data

US 2025/0016282 A1 Jan. 9, 2025

(30) Foreign Application Priority Data

Jul. 6, 2023 (JP) ................................ 2023-111247

(51) Int. Cl.
*H04N 1/64* (2006.01)
*B41J 2/175* (2006.01)

(52) U.S. Cl.
CPC .......... *H04N 1/648* (2013.01); *B41J 2/17566* (2013.01)

(58) Field of Classification Search
CPC .... H04N 1/648; B41J 2/17566; G06F 3/1207; G06F 3/1253; G06F 3/1275
USPC .......................................................... 358/2.1
See application file for complete search history.

(56) References Cited

U.S. PATENT DOCUMENTS 6,027,200 A * 2/2000 Takahashi ........... H04N 1/3871 347/7

FOREIGN PATENT DOCUMENTS

JP 2006-159709 A 6/2006

* cited by examiner

*Primary Examiner* — Charlotte M Baker
(74) *Attorney, Agent, or Firm* — Harness, Dickey & Pierce, P.L.C.

(57) ABSTRACT

A selection system includes a constraint condition designation section configured to receive a designation of a constraint condition related to the ink amount set, an evaluation condition designation section configured to receive a designation of an evaluation condition including an evaluation index related to the ink amount set, an ink amount calculation section configured to obtain a plurality of ink amount set candidates by executing an optimization process under the constraint condition, an evaluation index calculation section configured to calculate each of the evaluation indexes for the plurality of ink amount set candidates, and a notification section that is configured to add the evaluation index to each of the plurality of ink amount set candidates and that is configured to present it to a user.

5 Claims, 9 Drawing Sheets

IST

| Initial Ink Amount Set | C | M | Y | K | Lk | LLk |
|---|---|---|---|---|---|---|
| #1 | 0 | 0 | 0 | 0 | 0 | 0 |
| #2 | 10 | 0 | 0 | 0 | 0 | 0 |
| ... | ... | 0 | ... | ... | ... | ... |
| #11 | 100 | 0 | 0 | 0 | 0 | 0 |
| #12 | 0 | 10 | 0 | 0 | 0 | 0 |
| #13 | 10 | 10 | 0 | 0 | 0 | 0 |
| ... | ... | 10 | ... | ... | ... | ... |
| #22 | 100 | 10 | 0 | 0 | 0 | 0 |
| #23 | 0 | 20 | 0 | 0 | 0 | 0 |
| ... | ... | ... | ... | ... | ... | ... |
| #N | 100 | 100 | 100 | 100 | 100 | 100 |

FIG. 7

SELECTION SYSTEM, METHOD, AND COMPUTER PROGRAM FOR SELECTING INK AMOUNT SET

The present application is based on, and claims priority from JP Application Serial Number 2023-111247, filed Jul. 6, 2023, the disclosure of which is hereby incorporated by reference herein in its entirety.

BACKGROUND

1. Technical Field

The present disclosure relates to a selection system, a method, and a computer program for selecting an ink amount set.

2. Related Art

The printing device prints various printed products using a plurality of inks of different colors. Since there is a considerable degree of freedom in an ink amount set for reproducing the same color, various methods have been proposed for determining the ink amount set for reproducing a target color. JP-A-2006-159709 discloses a technique for determining an ink amount set after evaluating a metamerism characteristic. Metamerism characteristic means a characteristic that almost the same color appears even when observation conditions such as illumination light are changed.

However, in the above mentioned prior art, no means is provided for the user to select an appropriate ink amount set according to various applications and indexes.

SUMMARY

According to a first aspect of the present disclosure, a selection system is provided that is used to select an ink amount set of a plurality of ink colors to reproduce a target color.

This selection system includes a constraint condition designation section configured to receive a designation of a constraint condition related to the ink amount set; an evaluation condition designation section configured to receive a designation of an evaluation condition including an evaluation index related to the ink amount set; an ink amount calculation section configured to obtain a plurality of ink amount set candidates by executing an optimization process under the constraint condition; an evaluation index calculation section configured to calculate each of the evaluation indexes for the plurality of ink amount set candidates; and a notification section that is configured to add the evaluation index to each of the plurality of ink amount set candidates and that is configured to present them to a user.

According to a second aspect of the present disclosure, a method is provided for selecting an ink amount set of a plurality of ink colors for reproducing a target color.

This method includes (a) a step of receiving designation of a constraint condition related to the ink amount set; (b) a step of receiving designation of an evaluation condition including an evaluation index related to the ink amount set; (c) a step of obtaining a plurality of ink amount set candidates by executing optimization process under the constraint condition; (d) a step of calculating each of the evaluation indexes for the plurality of ink amount set candidates; and (e) a step of adding the evaluation index to each of the plurality of ink amount set candidates and presenting it to a user.

According to a third aspect of the present disclosure, there is provided a non-transitory computer-readable storage medium in which a computer program for selecting an ink amount set of a plurality of ink colors for reproducing a target color is stored.

This computer program includes (a) a process of receiving designation of a constraint condition related to the ink amount set; (b) a process of receiving designation of an evaluation condition including an evaluation index related to the ink amount set; (c) a process of obtaining a plurality of ink amount set candidates by executing an optimization process under the constraint condition; and (d) a process of calculating each of the evaluation indexes for the plurality of ink amount set candidates; and (e) a process of adding the evaluation index to each of the plurality of ink amount set candidates and presenting it to a user.

BRIEF DESCRIPTION OF THE DRAWINGS

FIG. 7 is an explanatory diagram showing an ink amount set table used for setting an initial value of the ink amount set.

DESCRIPTION OF EMBODIMENTS

Figure 1:
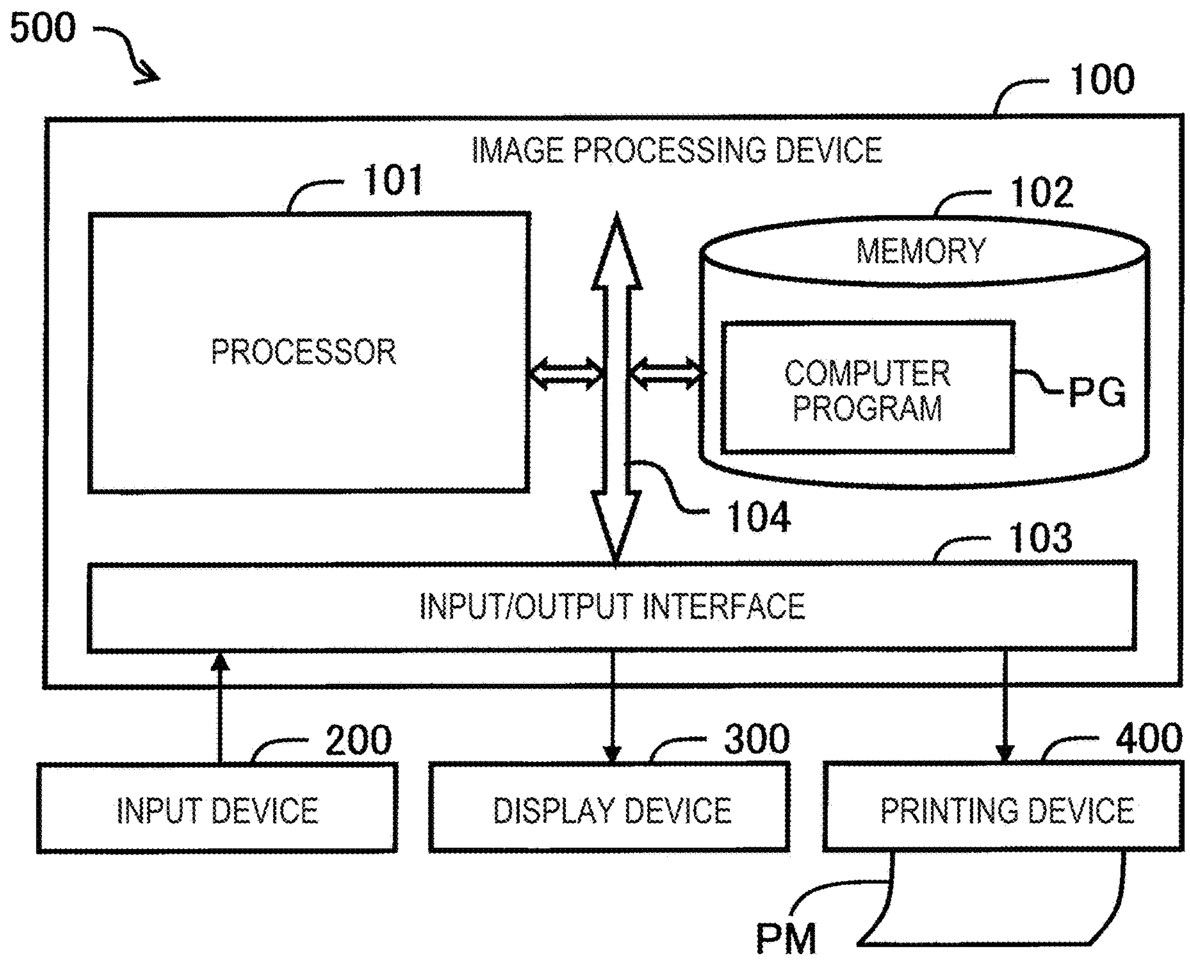
FIG. 1 is an explanatory diagram showing a configuration of a printing system.

FIG. 1 is an explanatory diagram showing a configuration of a printing system 500 of an embodiment. The printing system 500 includes an image processing device 100, an input device 200, a display device 300, and a printing device 400. However, the printing device 400 may be omitted. The image processing device 100 functions as a "selection system" of the present disclosure.

The image processing device 100 includes a processor 101, a memory 102, an input/output interface 103, and an internal bus 104. The processor 101, the memory 102, and the input/output interface 103 are bidirectionally communicatively connected via the internal bus 104. The memory 102 includes a volatile memory, such as a main memory and a video memory, and a nonvolatile memory, such as a hard disk and a solid state drive (SSD). The input device 200, the display device 300, and the printing device 400 are connected to the input/output interface 103 of the image processing device 100 by wire communication or wireless communication. The input device 200 is, for example, a keyboard or a mouse, and the display device 300 is, for example, a liquid crystal display. The input device 200 and the display device 300 may be integrated as a touch panel.

The printing device 400 is, for example, an inkjet printer, and prints an image on a printing medium PM using a plurality of types of ink.

As will be described below, in order to print a specific target color such as a logo or a corporate color by the printing device 400, the image processing device 100 executes a process of obtaining ink amount set candidates for reproducing a target color and presenting it to the user.

Figure 2:
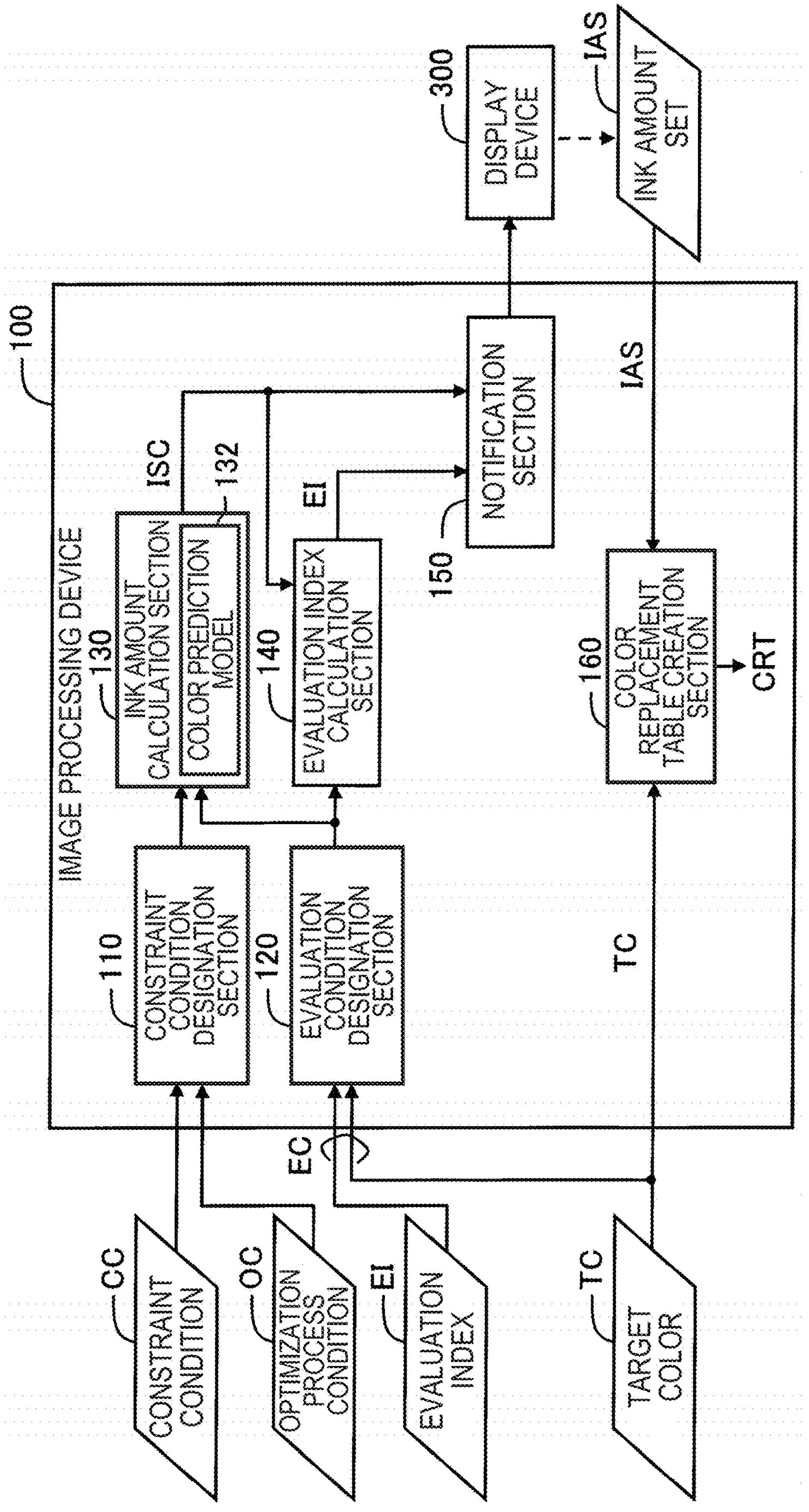
FIG. 2 is an explanatory diagram showing an example of a configuration of an image processing device.

FIG. 2 is an explanatory diagram showing an example of a configuration of the image processing device 100. The image processing device 100 includes a constraint condition designation section 110, an evaluation condition designation section 120, an ink amount calculation section 130, an evaluation index calculation section 140, a notification section 150, and a color replacement table creation section 160. The functions of these sections are realized in a software manner by the processor 101 executing the computer program PG stored in advance in the memory 102. However, a part of the function of each part may be realized by hardware circuitry.

The constraint condition designation section 110 accepts the designation of a constraint condition CC and an optimization process condition OC relating to an optimization process for obtaining the ink amount set candidates for reproducing a target color TC. The evaluation condition designation section 120 receives the designation of an evaluation condition EC. The evaluation condition EC includes an evaluation index EI and the target color TC. Examples of the constraint condition CC, the optimization process condition OC, and the evaluation condition EC will be described later. The ink amount calculation section 130 obtains a plurality of ink amount set candidates ISC for one target color TC by executing an optimization process under the constraint condition CC. In the present embodiment, the ink amount calculation section 130 uses a color prediction model 132 that predicts the spectral reflectance of the printed product reproduced by the ink amount set from the value of the ink amount set. The color prediction model 132 can be configured as, for example, the color prediction model based on a known spectral Neugebauer model or a regression model of a multidimensional output configured by a neural network. As the color prediction model based on the spectral Neugebauer model, a printing model described in JP-A-2006-334945 disclosed by the present applicant can be used. The evaluation index calculation section 140 calculates each of the evaluation indexes EI for the plurality of ink amount set candidates ISC. The notification section 150 adds the evaluation index EI to each of the plurality of ink amount set candidates ISC and presents it to the user.

The color replacement table creation section 160 creates the color replacement table CRT for the printing device 400 using the ink amount set IAS selected by the user from the plurality of ink amount set candidates ISC. The color replacement table CRT is a lookup table used for color conversion from an input color space or a device-independent color space to an output color space for the printing device 400. The input color space is, for example, an RGB color space or a CMYK color space. The device-independent color space is, for example, a CIE-L*a*b* color space or a CIE-XYZ color space. As the output color space for the printing device 400, various ink color spaces such as the CMYK color space and a CMYKLkLLk color space can be used. The "CMYKLkLLk color space" is a color space composed of six ink color components of cyan (C), magenta (M), yellow (Y), black (K), gray (Lk), and light gray (LLk). When the target color TC is printed using the printing device 400, color conversion from the input color space or the device-independent color space to the output color space for the printing device 400 is executed using the color replacement table CRT. Note that the color replacement table creation section 160 can be omitted.

Figure 3:
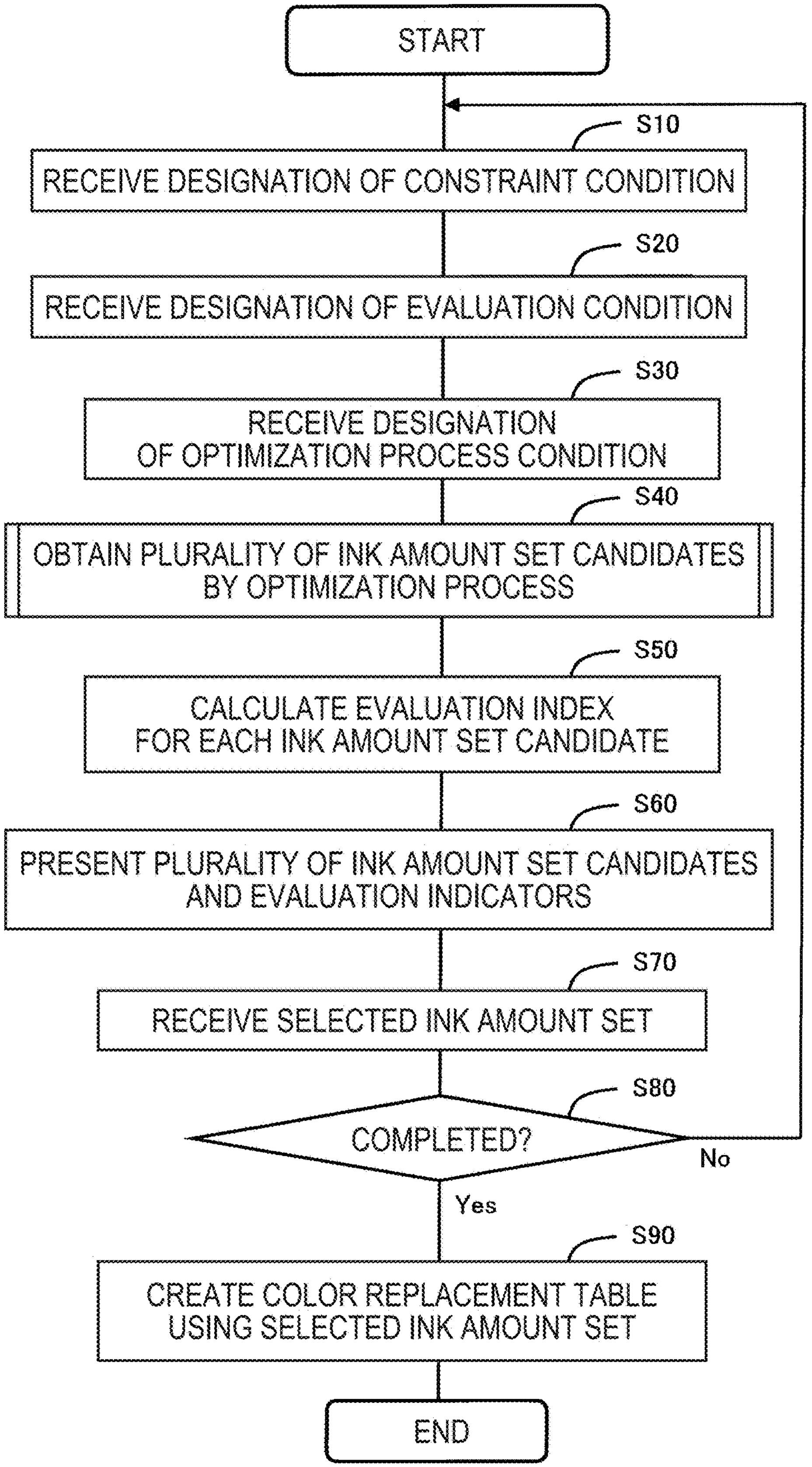
FIG. 3 is a flowchart showing a procedure of an ink amount set selection process for reproducing a target color.

FIG. 3 is a flowchart showing a procedure of a process of selecting the ink amount set for reproducing the target color. In step S10, the constraint condition designation section 110 receives the designation of the constraint condition CC.

Figure 4:
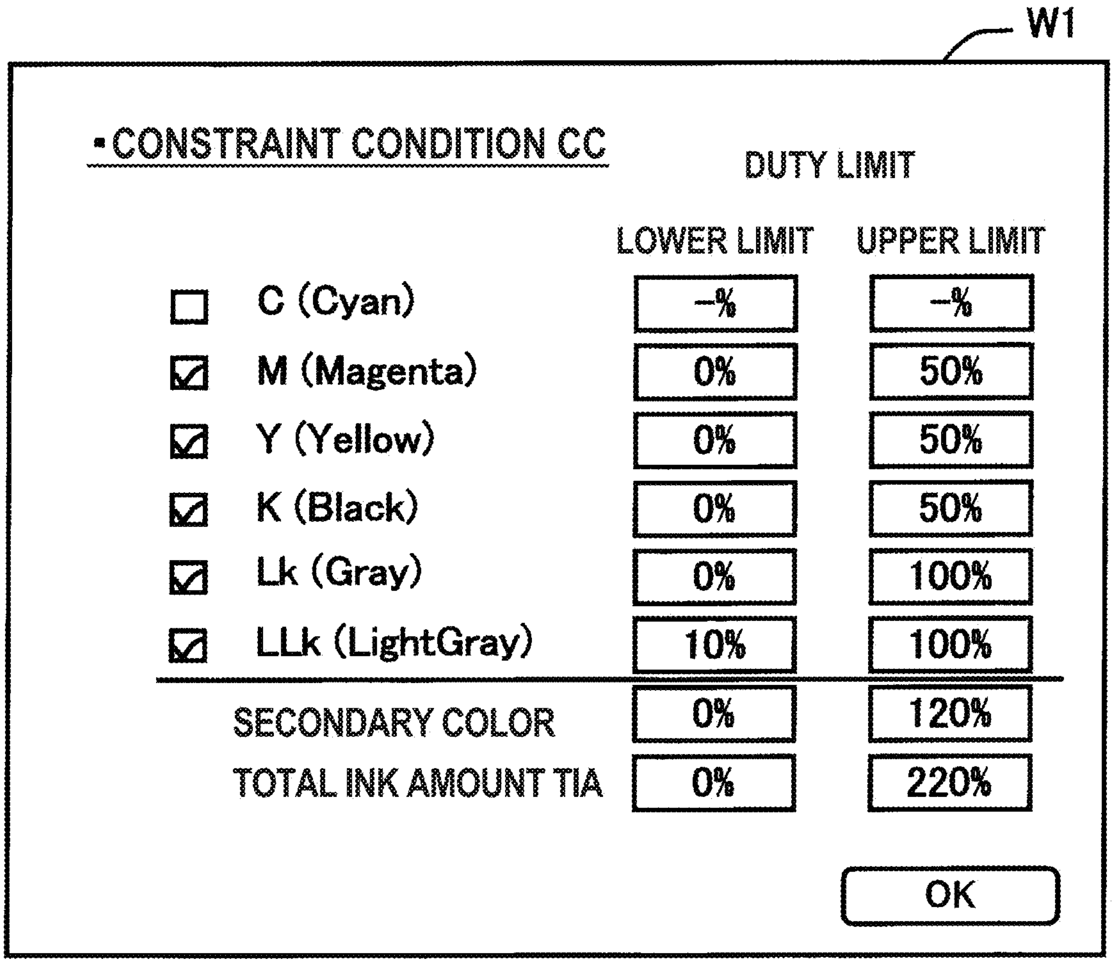
FIG. 4 is an explanatory diagram showing an example of a window for designating a constraint condition.

FIG. 4 is an explanatory diagram showing an example of a window W1 for designating the constraint condition CC. In this example, the constraint condition CC includes the following items.

(1) Usability for each ink usable by the printing device 400.

(2) Duty limit of the ink that is available.

(3) Duty limitation of a secondary color.

(4) Duty limit of total ink amount TIA.

The duty is a ratio of the amount of ink, and the duty of 100% means an amount corresponding to the solid application of ink. The duty of the secondary color is the sum of the duties of two types of inks that reproduce the secondary color. The lower limit value of the duty is set in consideration of graininess. For example, in a case where a light gray color can be reproduced by using either a light gray ink or a black ink, since reproduction with the black ink deteriorates graininess, it is desirable to set the lower limit value of the duty to the light gray color in order to preferentially use the light gray color. However, the lower limit value of the duty may be omitted. The duty limitation of the secondary color may be omitted. The user can arbitrarily designate these constraint conditions CC in accordance with the target color TC. In the example of FIG. 4, it is designated that the cyan ink cannot be used and the other five types of inks can be used. The ink amount calculation section 130 searches for the ink amount set, which is a combination of ink amounts satisfying the constraint condition CC.

In step S20, the evaluation condition designation section 120 receives the designation of the evaluation condition EC.

Figure 5:
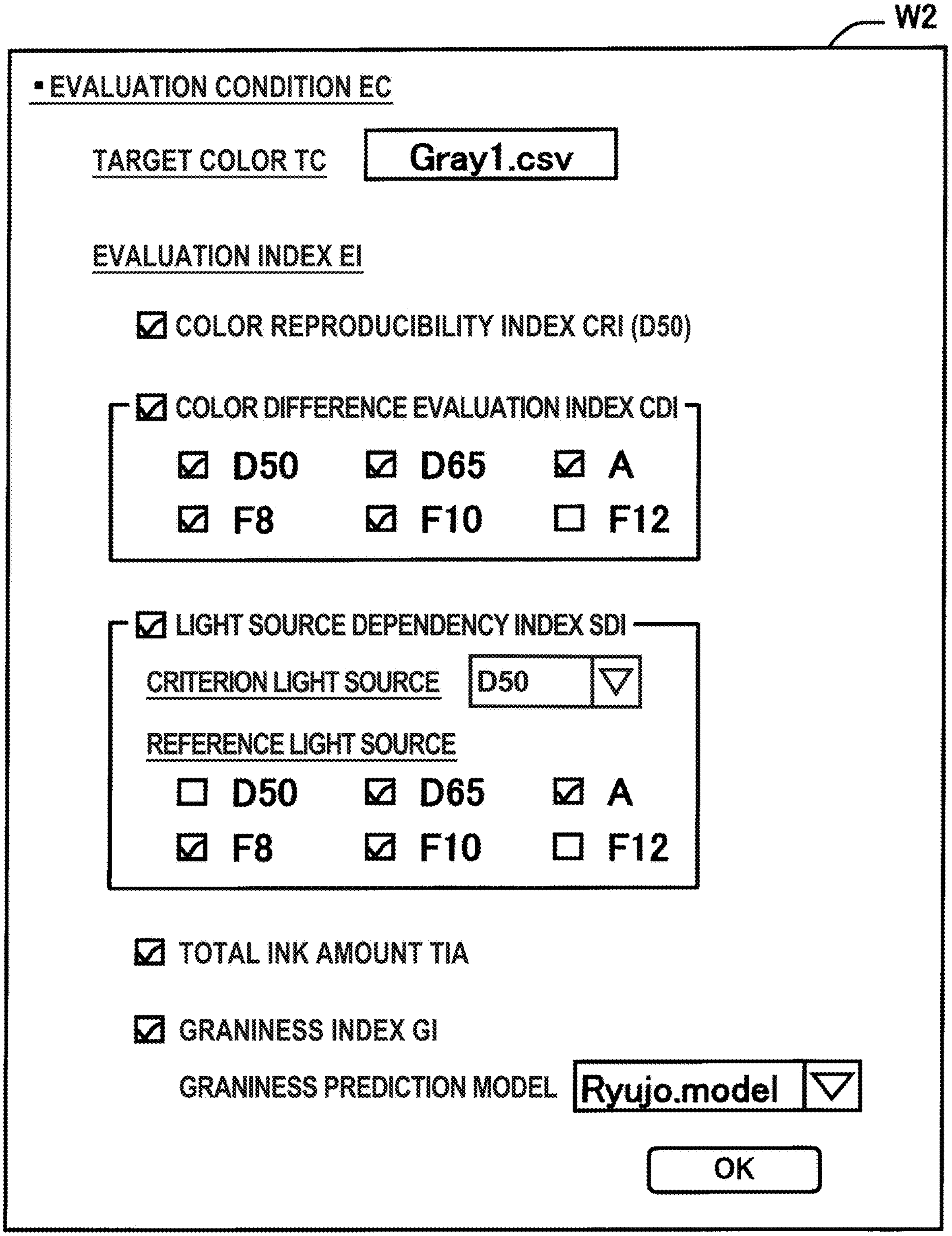
FIG. 5 is an explanatory diagram showing an example of a window for designating an evaluation condition.

FIG. 5 is an explanatory view showing an example of a window W2 for designating the evaluation condition EC. In this example, the evaluation condition EC includes the following items.

(1) The target color TC reproduced by the ink amount set candidate.

(2) The evaluation index EI to be calculated for the ink amount set candidate.

In the example of FIG. 5, data "Gray1.csv" representing the spectral reflectance of the target color TC is designated as data relating to the target color TC. This spectral reflectance is obtained by spectroscopically measuring the color patch of the target color TC. Note that the target color TC may be designated using the colorimetric value Lab in the CIE-L*a*b* color space or the tristimulus value XYZ in the CIE-XYZ color space instead of the spectral reflectance. The target color TC may be designated using a color name associated with the spectral reflectance. When a color name is used, the ink amount calculation section 130 executes a process of obtaining the ink amount set candidate using the spectral reflectance defined in association with the designated color name.

As the evaluation index EI, for example, one or more of the following can be used.

(a) Color reproducibility index CRI.

(b) Color difference evaluation index CDI.

(c) Light source dependency index SDI.

(d) Total ink amount TIA.

(e) Graininess index GI.

The color reproducibility index CRI is a color difference between a candidate color, which is a color reproduced by the ink amount set candidate, and the target color TC. The colorimetric value Lab of the candidate color can be obtained by predicting the spectral reflectance from the ink amount set candidate using the color prediction model 132, calculating the tristimulus value XYZ under the observation condition using the specific light source using the spectral reflectance, and converting the tristimulus value XYZ into the colorimetric value Lab. The colorimetric value Lab of the target color TC can be obtained by calculating the tristimulus value XYZ under the observation condition using the specific light source using the spectral reflectance of the target color TC and converting the tristimulus value XYZ into the colorimetric value Lab. The color reproducibility index CRI is calculated by applying these two colorimetric values Lab to the color difference equation of CIE DE2000 or the like. In the present embodiment, D50, which is a standard light source of CIE, is used as the specific light source used for calculation of the color reproducibility index CRI. However, other light sources, such as D65, may be used. Since the color reproducibility index CRI is a color difference between the candidate color and the target color TC, a smaller value is more desirable.

The color difference evaluation index CDI indicates a representative value of the color difference between the candidate color reproduced by the ink amount set candidate and the target color TC under a plurality of light sources. In the example of FIG. 5, as light sources for calculating the color difference evaluation index CDI, five light sources excluding F12 are selected from among six standard light sources of D50, D65, A, F8, F10, and F12. At this time, the color difference evaluation index CDI is calculated as the representative value of five color differences obtained by using each of the five light sources. As the representative value, it is desirable to use an average value. However, a maximum value or a median value may be used instead of an average value. Note that in a case where an observation location of the printed product is assumed, a spectral distribution actually measured at the observation location could be designated as the light source. Since the color difference evaluation index CDI is the representative value of the color difference between the candidate color and the target color TC under a plurality of light sources, a smaller value is preferable.

The light source dependency index SDI indicates a difference between the appearance of the candidate color reproduced by the ink amount set candidate under a criterion light source and the appearance under a reference light source. One of the plurality of light sources can be selected as the criterion light source, and one or more light sources can be selected as the reference light source. In the example of FIG. 5, D50 is selected as the criterion light source, and four standard light sources of D65, A, F8, and F10 are selected as the reference light sources. At this time, the light source dependency index SDI is calculated as the representative value of four color differences calculated from the colorimetric value Lab under the criterion light source of the candidate color and the colorimetric value Lab under each reference light source. As the representative value, it is desirable to use an average value. However, a maximum value or a median value may be used instead of an average value. Note that in a case where the observation location of the printed product is assumed, a spectral distribution actually measured at the observation location could be designated as the criterion light source. Since the light source dependency index SDI indicates the difference between the appearance of the candidate color under the criterion light source and the appearance under the reference light source, a smaller value is desirable.

The total ink amount TIA is a total value of the ink amounts of the ink amount set candidates. However, when the ink unit price of each color is different, weighting may be performed for each ink color. Instead of the total ink amount TIA, the ink amount for each ink color may be used as an evaluation index. Basically, since a large amount of ink leads to an increase in cost, a small amount of ink is desirable.

The graininess index GI is an index indicating the degree of graininess, that is, noise, perceived by an observer when the observer visually recognizes the printed product. As the graininess index GI, it is possible to use, for example, the graininess index GI described in Japanese Patent 4388553 of the present applicant. This graininess index GI is calculated as an index for simulating the recording state of dots in a virtual patch reproduced by the ink amount set candidate and evaluating the spatial frequency of the simulation result. Specifically, the graininess index GI is calculated by, for example, the following equation.

Equation 1

$$GI = a_L \int \sqrt{WS(u)}\, VTF(u) du \quad \text{(q1)}$$

Here, al is a lightness correction term, WS (u) is a Wiener spectrum of an image, VTF is a visual spatial frequency characteristic, and u is the spatial frequency. Although the one dimensional spatial frequency u is used in the equation (q1), the equation using the two dimensional spatial frequencies u and v is also similar.

Instead of using equation (q1) above, a graininess prediction model for calculating the graininess index GI from the ink amount set may be created by machine learning, and the graininess index GI may be obtained from the ink amount set candidates using the graininess prediction model. In the example of FIG. 5, it is designated to use the graininess prediction model "Ryujo.model" created using machine learning. The smaller the graininess index GI is, the more desirable it is.

As the items of the evaluation condition EC, some of the items shown in FIG. 5 may be omitted, or items other than these may be added. However, it is desirable that the evaluation condition EC includes at least the evaluation index EI.

In step S30, the constraint condition designation section 110 receives the designation of the optimization process condition OC.

Figure 6:
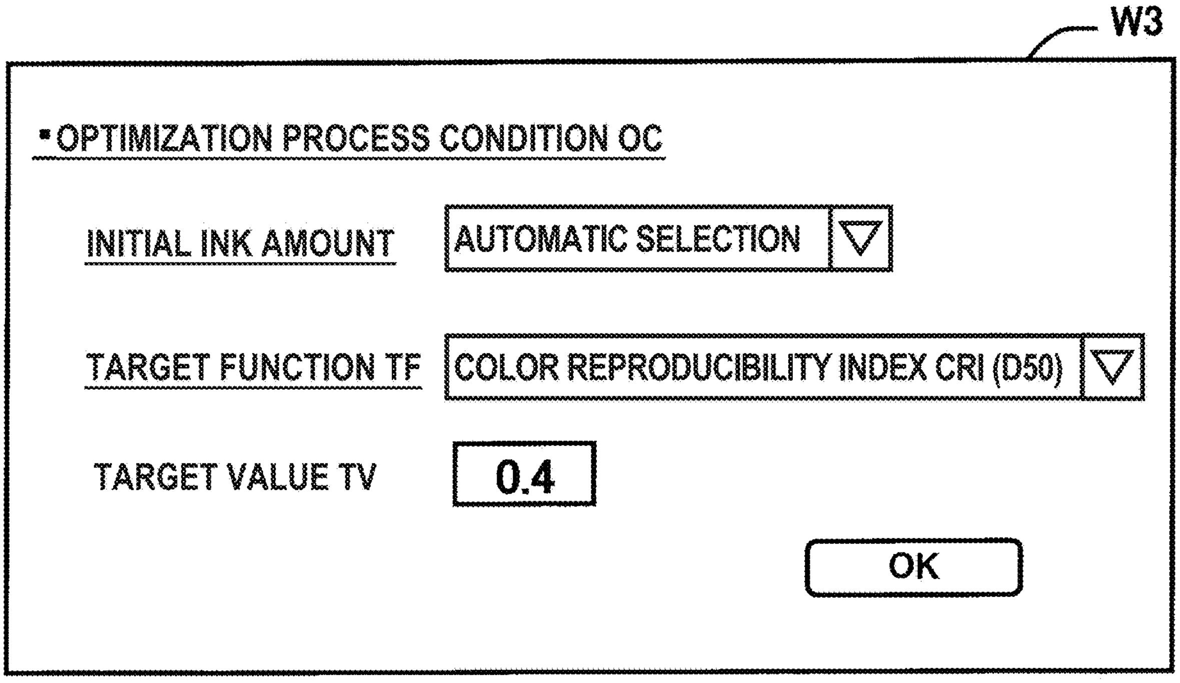
FIG. 6 is an explanatory diagram showing an example of a window for designating an optimization process condition.

FIG. 6 is an explanatory diagram showing an example of a window W3 for designating the optimization process condition OC. In this example, the optimization process condition OC includes the following items.

(1) An initial ink amount, which is the initial value of the ink amount set.

(2) A target function TF and a target value TV in the optimization process for searching the ink amount set candidate.

In the example of FIG. 6, the automatic selection of the initial ink amount is designated. FIG. 7 is an explanatory diagram showing an ink amount set table IST used for setting the initial value of the ink amount set. The ink amount set table IST is a group of ink amount sets sampled at equal intervals in the ink amount space CMYKLkLLk. In the example of FIG. 7, sampling is performed at equal intervals of 10%, so that the number of ink amount sets is $11^6$. The ink amount calculation section 130 automatically selects the initial value satisfying the constraint condition CC from the ink amount set table IST, and searches for the ink amount set candidate.

The color reproducibility index CRI is selected as the target function TF of the optimization process. Another index may be used as the target function TF, or an integrated index including a plurality of indices may be used. However, it is desirable that the target function TF includes the color difference between the color reproduced by the ink amount set candidate and the target color TC. The target value TV of the target function TF can be arbitrarily set by the user according to the type of the target function TF. Note that instead of setting the optimization process condition OC by the user, a condition set in advance may be used.

In step S40 of FIG. 3, the ink amount calculation section 130 obtains a plurality of ink amount set candidates ISC capable of reproducing the target color TC by the optimization process.

Figure 8:
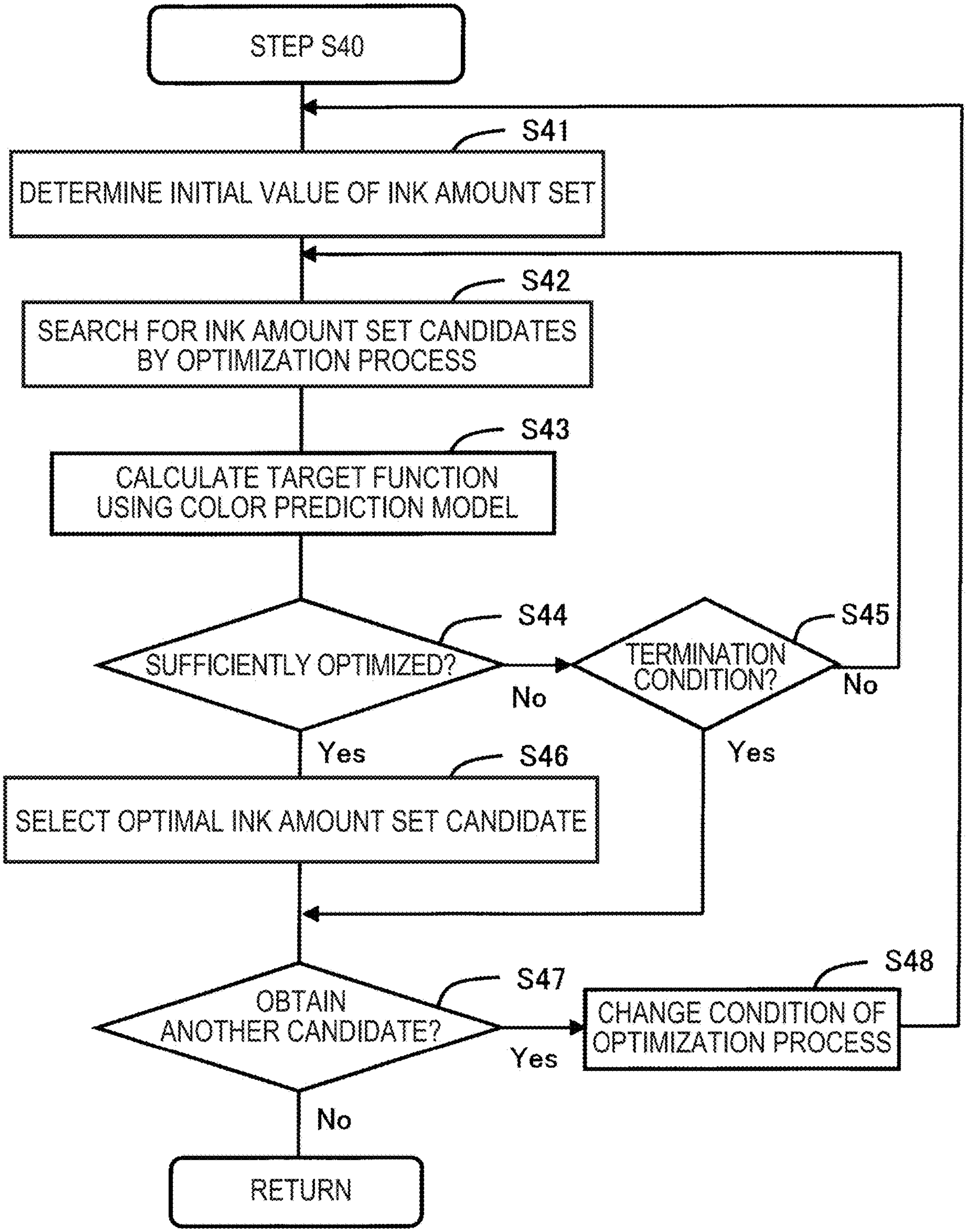
FIG. 8 is a flowchart showing the processing procedure of step S40.

FIG. 8 is a flowchart showing the processing procedure of step S40. In step S41, the ink amount calculation section 130 determines the initial value of the ink amount set. In step S42, the ink amount calculation section 130 searches for one ink amount set candidate ISC by executing the optimization process under the constraint condition CC set in FIG. 4. However, when step S42 is executed for the first time, the initial value determined in step S41 is used as it is as the ink amount set candidate ISC.

In step S43, the ink amount calculation section 130 calculates the target function TF of the ink amount set candidate ISC using the color prediction model 132. As the target function TF, the color reproducibility index CRI is selected in the optimization process condition OC of FIG. 6.

In step S44, the ink amount calculation section 130 determines whether or not the ink amount set candidate ISC has been sufficiently optimized. Specifically, when the target function TF becomes equal to or less than the target value TV set in advance, it is determined that the optimization has been sufficiently performed. On the other hand, when the target function TF is larger than the target value TV, it is determined that the optimization has not been sufficiently performed. If the optimization has been sufficiently performed, the ink amount calculation section 130 selects one optimum ink amount set candidate ISC in step S46, and the process proceeds to step S47 (to be described later).

On the other hand, if the optimization has not been performed sufficiently, the process proceeds to step S45, and the ink amount calculation section 130 determines whether or not a termination condition of the optimization process is satisfied. Specifically, when the number of searches or the search time reaches the upper limit value, it is determined that the termination condition is satisfied, and when the number of searches or the search time does not reach the upper limit value, it is determined that the termination condition is not satisfied. If the termination condition is not satisfied, the processing returns to step S42, and the processing after step S42 is executed again. When the termination condition is satisfied, the process proceeds to step S47.

In step S47, the ink amount calculation section 130 determines whether or not to execute a process for obtaining another ink amount set candidate ISC. In the present embodiment, since the ink amount set candidates ISC are obtained for one target color TC, in a case where the number of ink amount set candidates ISC does not reach a target number, which is set in advance, it is determined that a process of obtaining another ink amount set candidate ISC is executed. For example, when another ink amount set candidate ISC is obtained by changing the way of giving the initial value of the ink amount set, the number of loops of steps S41 to S48 is equal to the number of initial values of the ink amount set.

When the process of obtaining another ink amount set candidate ISC is executed, the condition of the optimization process is changed in step S48. Specifically, for example, the next ink amount set candidate ISC can be searched for by executing one or more of the following changes.

(1) The initial value of the ink amount set is changed.

(2) A part of the constraint condition CC is changed.

(3) The target function TF is changed.

These changes may be performed by the user, but it is desirable that the ink amount calculation section 130 automatically performs these changes. For example, in the case where the constraint condition such as $0<K<100$ is given as the duty limit of the K ink, a plurality of variations such as (i) $0<K<50$, (ii) $0<K<80$, and (iii) $10<K<100$ may be set as the internal processing of the ink amount calculation section 130 and used as the change of the constraint condition CC.

After step S48, the process returns to step S41, and the processes of steps S41 to S47 are executed again. In this way, the plurality of ink amount set candidates ISC can be obtained by executing the optimization process while changing a part of the conditions of the optimization process. When the process of step S40 is completed, the process proceeds to step S50 in FIG. 3.

In step S50, the evaluation index calculation section 140 calculates the evaluation index EI for each ink amount set candidate ISC. In the example of FIG. 5, since the color reproducibility index CRI, the color difference evaluation index CDI, the light source dependency index SDI, the total ink amount TIA, and the graininess index GI are selected as the evaluation indices EI, these evaluation indices EI are calculated for each of the ink amount set candidates ISC. The value of the evaluation index EI is supplied to the notification section 150 together with the ink amount set candidate ISC. In step S60, the notification section 150 presents the plurality of ink amount set candidates ISC and the evaluation indices EI to the user.

Figure 9:
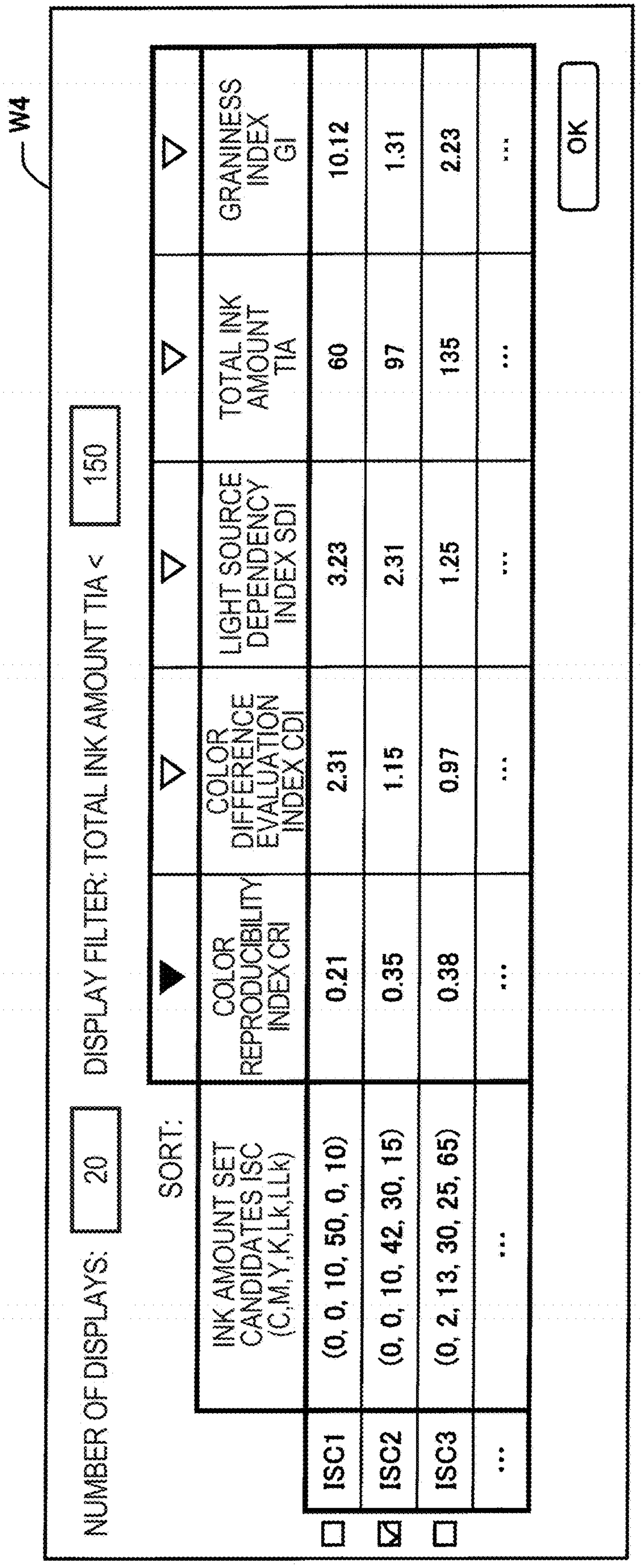
FIG. 9 is an explanatory diagram showing an example of a window for notifying a plurality of ink amount set candidates.

FIG. 9 is an explanatory diagram showing a window W4 for notifying the plurality of ink amount set candidates ISC. Here, an evaluation index EI is added to and displayed for each of the plurality of ink amount set candidates ISC obtained for one target color TC. Although the number of displayed ink amount set candidates ISC is set to 20, only three ink amount set candidates ISC1 to ISC3 are shown in FIG. 9 as an example. In this example, a filter in which the total ink amount TIA of less than 150 is set as a display target is used. However, a filter using another index may be applied. In this window W3, it is further possible to perform sorting using any one of the five items CRI, CDI, SDI, TIA, and GI of the evaluation index EI. In the example of FIG. 9, the ink amount set candidates ISC are sorted in ascending order of the color reproducibility index CRI. Note that sorting may be performed using the plurality of items in a composite manner. The user can select one desirable ink amount set candidate ISC according to the use from the plurality of ink amount set candidates ISC. That is, the user can select an appropriate ink amount set candidate according to various applications such as an application in which absolute color reproducibility is prioritized, an application in which the same appearance is desired to be provided under various light sources, and an application in which the ink amount is desired to be suppressed. In the example of FIG. 9, the second ink amount set candidate ISC2 is selected as the ink amount set suitable for reproduction of the target color TC.

In step S70 of FIG. 3, the color replacement table creation section 160 receives one ink amount set IAS selected in step S60. The target color TC is also input to the color replacement table creation section 160.

In step S80, it is determined whether the processing of steps S10 to S70 has been completed. When there are a plurality of target colors TC, if the processing of steps S10 to S70 have been completed for all of the target colors TC, it is determined that the processing has been completed. When the processing is not completed, the processing of steps S10 to S70 is executed again. In step S90, the color replacement table creation section 160 creates the color replacement table CRT for the printing device 400 using the ink amount set IAS and the target color TC. However, step S90 may be omitted.

As described above, in the present embodiment, since the plurality of ink amount set candidates ISC are obtained for one target color TC using the constraint condition CC and the evaluation condition EC designated by the user, and the evaluation index EI for each ink amount set candidate ISC is added and presented to the user, the user can easily select an ink amount set suitable for reproducing the target color TC. In the present embodiment, since it is possible to freely select the ink amount set suitable for the partial region or the color gamut of the printed product, it is possible to create the content reflecting the intention of the user. Specifically, for example, it is possible to create content that reflects the intention of using an ink amount set that emphasizes ink cost for the target color of a background having a large area, and using an ink amount set that emphasizes color reproducibility for a special target color such as a corporate color.

Other Forms

The present disclosure is not limited to the above described embodiments and can be realized in various forms without departing from the spirit thereof. For example, the present disclosure can also be realized by the following aspects. The technical features in the above described embodiments corresponding to the technical features in each aspect described below can be appropriately replaced or combined in order to solve a part or all of the problems of the present disclosure or in order to achieve a part or all of the effects of the present disclosure. If the technical features are not described as essential in this specification, the technical features can be appropriately deleted.

(1) According to a first aspect of the present disclosure, a selection system is provided that is used to select an ink amount set of a plurality of ink colors to reproduce a target color. This selection system includes a constraint condition designation section configured to receive a designation of a constraint condition related to the ink amount set; an evaluation condition designation section configured to receive a designation of an evaluation condition including an evaluation index related to the ink amount set; an ink amount calculation section configured to obtain a plurality of ink amount set candidates by executing an optimization process under the constraint condition; an evaluation index calculation section configured to calculate each of the evaluation indexes for the plurality of ink amount set candidates; and a notification section that is configured to add the evaluation index to each of the plurality of ink amount set candidates and that is configured to present them to a user.

According to this selection system, the user can easily select the ink amount set suitable for reproduction of the target color from the plurality of ink amount set candidates.

(2) The above described selection system may be such that the constraint condition includes at least one of usability of each ink color, duty limit of each ink color, and duty limit of a total ink amount.

According to this selection system, it is possible to impose the constraint condition as to which ink color is used and to what extent.

(3) The above described selection system may be such that the evaluation index includes at least one of a color reproducibility index indicating a color difference between a candidate color represented by the ink amount set candidate and the target color under a specific light source, a color difference evaluation index indicating a representative value of the color differences between the candidate color and the target color under a plurality of light sources, a light source dependency index indicating a difference between appearance under a criterion light source and appearance under a reference light source of the candidate color, a total ink amount of the ink amount set candidate, and a graininess index of printed product reproduced by the ink amount set candidate.

According to this selection system, index values relating to various evaluation indices can be presented together with the ink amount set.

(4) The above described selection system may be such that the ink amount calculation section is configured to obtain the plurality of ink amount set candidates in the optimization process by executing at least one of (i) changing an ink amount set initial value, (ii) changing the constraint condition, and (iii) changing a target function.

According to this selection system, the plurality of ink amount set candidates can be obtained under various conditions.

(5) According to a second aspect of the present disclosure, a method for selecting an ink amount set of a plurality of ink colors for reproducing a target color is provided.

This method includes (a) a step of receiving designation of a constraint condition related to the ink amount set; (b) a step of receiving designation of an evaluation condition including an evaluation index related to the ink amount set; (c) a step of obtaining a plurality of ink amount set candidates by executing optimization process under the constraint condition; (d) a step of calculating each of the evaluation indexes for the plurality of ink amount set candidates; and (e) a step of adding the evaluation index to each of the plurality of ink amount set candidates and presenting it to a user.

(6) According to a third aspect of the present disclosure, a computer program for selecting an ink amount set of a plurality of ink colors for reproducing a target color is provided.

This computer program includes (a) a process of receiving designation of a constraint condition related to the ink amount set; (b) a process of receiving designation of an evaluation condition including an evaluation index related to the ink amount set; (c) a process of obtaining a plurality of ink amount set candidates by executing an optimization process under the constraint condition; (d) a process of calculating each of the evaluation indexes for the plurality of ink amount set candidates; and (e) a process of adding the evaluation index to each of the plurality of ink amount set candidates and presenting it to a user.

The present disclosure can also be realized in various forms other than the image processing device, the printing system, and the computer program. For example, it can be realized in the form of an image processing method, a non-transitory storage medium in which a computer program is recorded, or the like.

What is claimed is:

1. An image processing device comprising:
- an interface configured to exchange information between the image processing device and an external device;
- a memory configured to store a program; and
- a processor configured to execute the program so as to:
  - receive, via the interface, a designation of a constraint condition related to an ink amount set of a plurality of inks in different colors, the constraint condition including:
    - usability for each ink of the plurality of inks for a printing device;
    - a duty limit of an available ink of the plurality of inks;
    - a duty limit of a secondary color ink of the plurality of inks; and
    - a duty limit of a total ink amount of the plurality of inks;
  - receive, via the interface, a designation of an evaluation condition including an evaluation index related to the ink amount set, the evaluation index including at least one of:
    - a color reproducibility index;
    - a color difference evaluation index;
    - a light source dependency index;
    - the total ink amount; and
    - a graininess index;
  - obtain a plurality of ink amount set candidates by executing an optimization process, the plurality of ink amount set candidates satisfying the constraint condition;
  - the evaluation index for respective candidate of the plurality of ink amount set candidates;
  - link the evaluation index to each of the plurality of ink amount set candidates; and
  - cause a display to display corelated information between the evaluation index and the each of the plurality of ink amount set candidates.

2. The image processing device according to claim 1, wherein
- the processor is further configured to obtain the plurality of ink amount set candidates in the optimization process by executing at least one of
  - (i) changing an ink amount set initial value,
  - (ii) changing the constraint condition, and
  - (iii) changing a target function.

3. The image processing device according to claim 1, wherein
- the evaluation index includes at least one of the color reproducibility index indicating a color difference between a candidate color represented by the ink amount set candidate and the target color under a specific light source, the color difference evaluation index indicating a representative value of the color differences between the candidate color and the target color under a plurality of light sources, the light source dependency index indicating a difference between appearance under a criterion light source and appearance under a reference light source of the candidate color, the total ink amount of the ink amount set candidate, and the graininess index of printed product reproduced by the ink amount set candidate.

4. A non-transitory computer-readable storage medium storing a computer program for causing a computer to execute a process by a processor so as to perform the steps of:
- receiving a designation of a constraint condition related to an ink amount set of a plurality of inks in different colors, the constraint condition including:
  - usability for each ink of the plurality of inks for a printing device;
  - a duty limit of an available ink of the plurality of inks;
  - a duty limit of a secondary color ink of the plurality of inks; and
  - a duty limit of a total ink amount of the plurality of inks;
- receiving a designation of an evaluation condition including an evaluation index related to the ink amount set, the evaluation index including at least one of:
  - a color reproducibility index;
  - a color difference evaluation index;
  - a light source dependency index;
  - the total ink amount; and
  - a graininess index;
- obtaining a plurality of ink amount set candidates by executing an optimization process, the plurality of ink amount set candidates satisfying the constraint condition;
- calculating the evaluation index for respective candidate of the plurality of ink amount set candidates;
- linking the evaluation index to each of the plurality of ink amount set candidates; and
- causing a display to display corelated information between the evaluation index and the each of the plurality of ink amount set candidates.

5. An image processing method for causing a processor to execute a process, the image processing method comprising executing on the processor the steps of:
- receiving a designation of a constraint condition related to an ink amount set of a plurality of inks in different colors, the constraint condition including:
  - usability for each ink of the plurality of inks for a printing device;
  - a duty limit of an available ink of the plurality of inks;
  - a duty limit of a secondary color ink of the plurality of inks; and
  - a duty limit of a total ink amount of the plurality of inks;
- receiving a designation of an evaluation condition including an evaluation index related to the ink amount set, the evaluation index including at least one of:
  - a color reproducibility index;
  - a color difference evaluation index:
  - a light source dependency index;
  - the total ink amount; and
  - a graininess index;
- obtaining a plurality of ink amount set candidates by executing optimization process, the plurality of ink amount set candidates satisfying the constraint condition;
- calculating the evaluation index for respective candidate of the plurality of ink amount set candidates;
- linking the evaluation index to each of the plurality of ink amount set candidates; and causing a display to display corelated information between the evaluation index and the each of the plurality of ink amount set candidates.

* * * * *